April 7, 1942. S. E. B. SODERBERG 2,278,952
PILOT VALVE
Filed Jan. 13, 1939 4 Sheets-Sheet 1

INVENTOR
Sten E. B. Soderberg
BY
O. V. Thien
ATTORNEY

April 7, 1942.                S. E. B. SODERBERG                2,278,952
                                  PILOT VALVE
                    Filed Jan. 13, 1939           4 Sheets-Sheet 3

INVENTOR
Sten E. B. Soderberg
BY
O. [signature]
ATTORNEY

April 7, 1942.　　　S. E. B. SODERBERG　　　2,278,952
PILOT VALVE
Filed Jan. 13, 1939　　　4 Sheets-Sheet 4

INVENTOR
Sten E. B. Soderberg
BY
ATTORNEY

Patented Apr. 7, 1942

2,278,952

UNITED STATES PATENT OFFICE 2,278,952

PILOT VALVE

Sten E. B. Soderberg, Passaic, N. J., assignor to Leslie Company, Lyndhurst, N. J.

Application January 13, 1939, Serial No. 250,680

18 Claims. (Cl. 50—10)

The present invention relates to pilot valves such as are used to control fluid actuating regulators. In the specification of this application the pilot will be described as working in conjunction with a pressure regulator and acting responsively to the pressure on the outlet side of the regulator. The applicant does not wish to restrict himself however to the use of the pilot valve to this particular relation.

The principal object of the invention is to provide an improved pilot valve which will result in more stable action of the regulator than was possible with pilot valves employed heretofore.

In general the pilot valve operates on the principle of pilot valves using an auxiliary fluid to position the regulator. Most of such pilot valves waste a great deal of auxiliary fluid in doing this, and one of the objects of the present invention is to minimize such waste.

The pilot valve employed in my invention is of the positively seating type. Where such a type has been used heretofore, its use has usually involved the use of a stuffing-box through which the stem or a corresponding part of the valve extends. The friction this involves is indeterminate in amount and interferes with the precise action of the valve. One of the objects of my invention is to provide a pilot valve of this type which, while accomplishing the other objects of the invention, avoids the use of any stuffing box for a pilot valve.

It will be clear from the description of the invention given below, that the pilot valve provided by me, while normally operating with no appreciable waste of actuating fluid, can if so desired be adjusted for operation like that of types used heretofore with a continuous flow to waste of operating fluid. In such former types, the duct through which the actuating fluid enters has a restriction of constant cross-section, and all variations in pressure of the actuating fluid are obtained by varying the position of a valve in the duct leading to waste. With my valve adjusted for such operation, not only is the position of the valve in the outlet duct changed, but under certain conditions the position of a valve located in the inlet duct is changed, thereby obtaining advantages more fully pointed out below.

From a reading of the description given below it will be understood that results similar to those obtained with the present device can possibly be obtained by pilot valves of the slide or plunger type. They, however, have the great disadvantage that such valves, if they are fitted loosely enough to respond promptly, allow considerable quantities of operating fluid to leak away; and if they are fitted snugly enough to avoid this do not respond promptly or consistently. In my improved device positively seated disk-type valves are employed, but, as already stated, all packing or stuffing boxes which could cause friction are avoided.

In describing the invention reference will be made to the accompanying drawings, in which.

Figure 1:
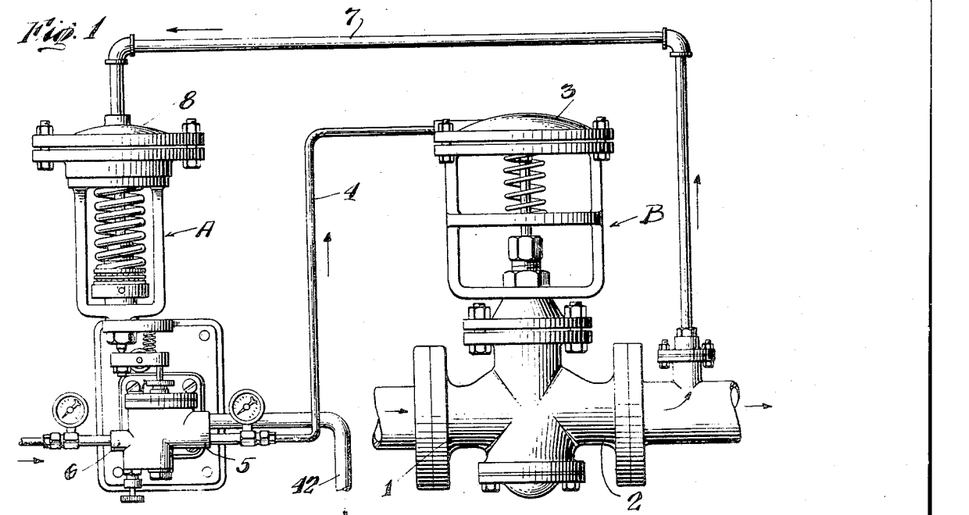
Fig. 1 shows an elevation of an arrangement in which this pilot valve appears controlling a pressure regulator.

The pilot valve assembly is in Fig. 1 indicated generally by the reference letter A and the regulating valve or regulator by reference letter B. The fluid to be controlled enters the regulator at some high pressure at 1 and leaves at reduced pressure at 2. The valve in regulator B is actuated by a diaphragm in diaphragm chamber 3, the actuating fluid being admitted to this chamber through pipe 4 which leads from the outlet 5 of pilot valve A. This actuating or auxiliary fluid enters the pilot valve at inlet 6. The auxiliary fluid may be taken from any desired source. It may, for example, be taken from the line delivering fluid to the inlet to the regulating valve. It may, however, be from a different source and of a different nature. For example, if the fluid controlled by the regulator is steam, the auxiliary fluid entering at 6 may be air or water under pressure.

The pilot valve acts responsively to the pressure on the outlet side of the regulator, for which purpose the line 7 connects this outlet to the diaphragm chamber 23 of the pilot valve.

Figure 3:
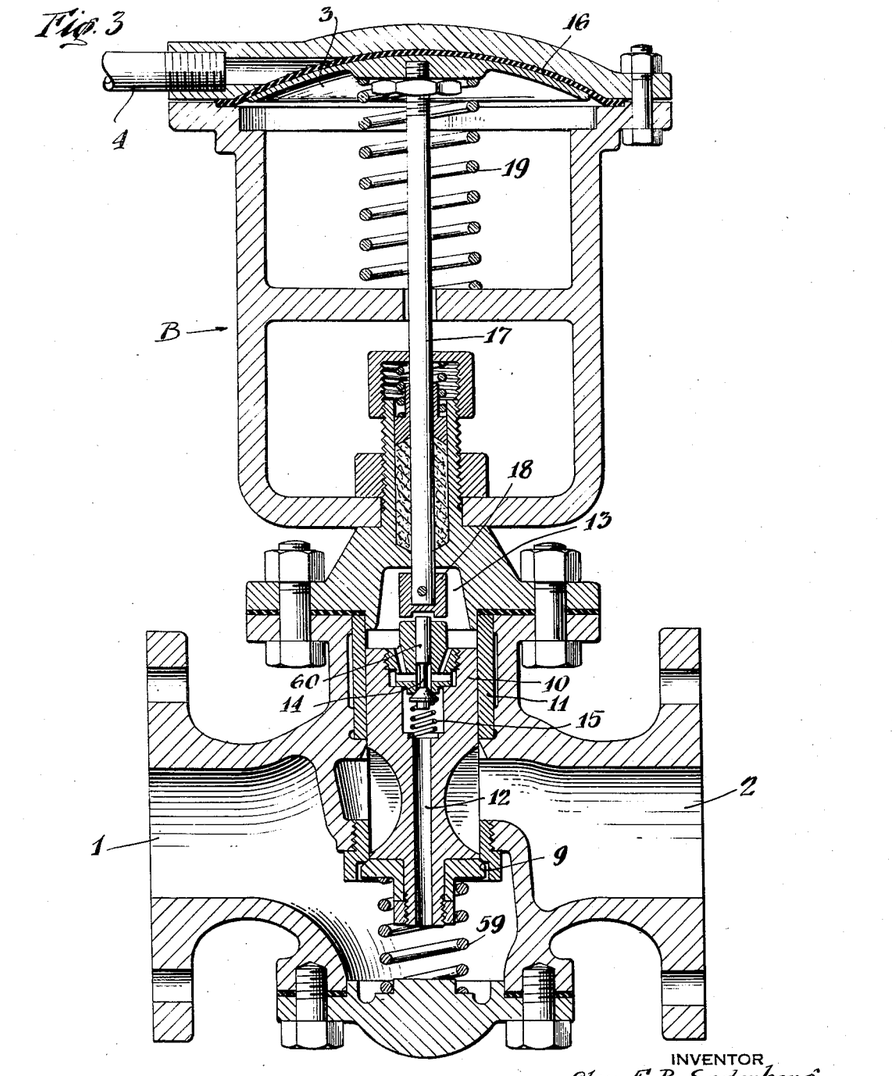
Fig. 3 is an enlarged axial section of the preferred form of regulator.

Referring more particularly now to Fig. 3, illustrating the preferred form of regulating valve, there is shown here a disk valve 9 controlling a port between inlet 1 and outlet 2. This disk valve 9 is urged upwardly by spring 59 and is connected to a piston 10 fitting into the cylinder 11. A passage 12 extending through valve 9 and piston 10 connects the inlet side 1 to balancing chamber 13 at the upper end of piston 10. This passage is controlled by balancing valve 14 urged in an upward direction toward its seat by spring 15. The valve 14 has an upwardly extending stem 60.

In the diaphragm chamber at the upper end of the regulator is arranged the diaphragm 16 from which stem 17 extends downwardly, being provided at its lower end with a button 18. Pressure on the upper side of diaphragm 16 tends to move stem 17 downwardly, such motion being resiliently opposed by spring 19. When the pressure above the diaphragm is high enough to overcome the resistance of the spring, button 18 first comes into contact with the upper end of stem 60 of valve 14, opening this valve and admitting pressure fluid through passage 12 to the upper side of piston 10. This balances the valve 9 and piston 10 and further downward movement of the diaphragm opens valve 9. The valve being balanced is readily opened and held in its proper position.

As stated above this regulating valve is one preferably employed in connection with the present invention; but it is to be understood that some other form may be employed, such as a double-seated balanced valve, or some other form of balanced or possibly even unbalanced valve.

Figures 2, 2A:
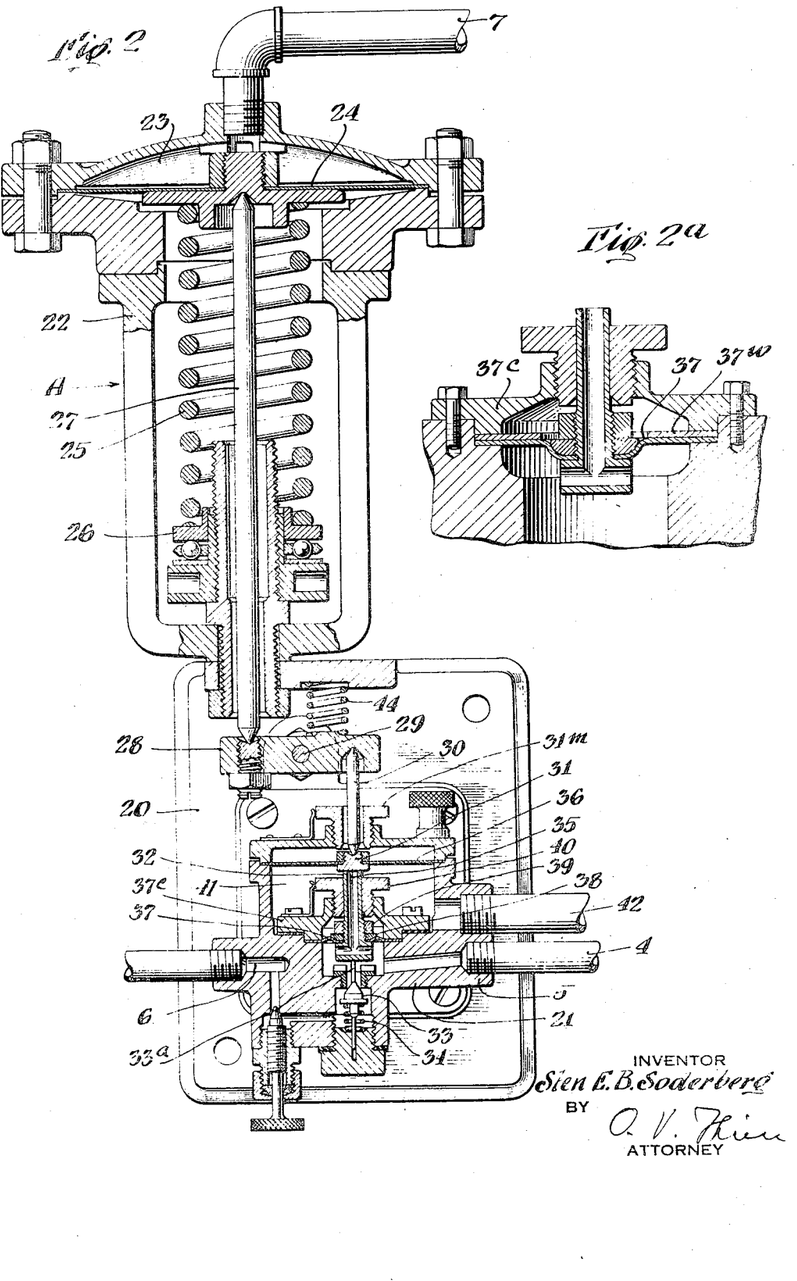
Fig. 2 is an enlarged axial section of the improved pilot valve.
Fig. 2a is a still further enlarged sectional view showing a variation of one detail of Fig. 2.

The pressure fluid or auxiliary fluid admitted to the upper side of diaphragm 16 comes through pipe 4 from the outlet 5 of the pilot valve A. This pilot valve is mounted on a bracket 20 carrying the valve body 21 and the pressure responsive means 22. This pressure responsive means comprises the diaphragm chamber 23 closed at its lower side by the diaphragm 24. To the diaphragm chamber 23 fluid is admitted as already stated above, through pipe 7 from the outlet side 2 of the regulator valve. Downward motion of the diaphragm 24 is opposed by the spring 25, the opposing force being adjustable by means of mechanism such as indicated at 26.

Movement of the diaphragm is transmitted by rod 27 to lever 28. This lever is pivoted at 29, and its motion is transmitted by rod 30 to disk valve 31, nozzle or tube 32, and valve 33. A light spring 44 urges the right-hand end of lever 28 downwardly.

Valve 33 controls communication between the inlet 6 and outlet 5. It seats upwardly and is normally held on its seat by spring 34. It has an upwardly extending stem 33a whose upper end engages the lower end of nozzle 32. This nozzle 32 extends slidably through guide nut 40 and has extending through it a port or passage 35, the outlet end of which is controlled by disk valve 31. This disk valve 31 is secured to diaphragm 36. Its upward movement is adjustably limited by nut 31m. The nozzle 32 itself is clamped to a diaphragm 37 by means of washer 38 and nut 39. In the uppermost position of the nozzle, nut 39 engages the lower end of guide nut 40, which thus forms a stop for the upward motion of nozzle 32. Guide nut 40 is adjustable as to its position vertically. The dimension and adjustment of the parts are preferably such, that when valve 33 is seated, diaphragm 37 must still flex upward a further slight distance before nut 39 engages the lower end of guide nut 40. The device is however not limited to this adjustment, as will be explained in more detail below.

Port 35 of nozzle 32 discharges into chamber 41 which is in communication with a discharge line 42. Pipe 4 conducts auxiliary fluid from the outlet 5 to diaphragm chamber 3 of the regulator B or at times in the reverse direction.

The action of this device is as follows: Starting with the whole mechanism idle, i. e., with no high pressure fluid entering at 1 and no auxiliary pressure entering at 6, the parts will be in the following position: Spring 25 prevents rod 27 from transmitting any pressure to lever 28. Spring 44, which is stronger than the light spring 34, therefore forces valve 31 into closed position on outlet of nozzle 32 and holds valve 33 open. Spring 59 holds disk valve 9 of the regulator closed.

Now if high pressure fluid is admitted to 1 and auxiliary pressure fluid to 6, the latter flows through the port left open by valve 33 to outlet 5 and to diaphragm chamber 3, compressing spring 19 and opening balancing valve 14, thereby admitting steam to the balancing chamber 13 above piston 10 and by further motion of the diaphragm 16 then opening valve 9. This allows the high pressure fluid to flow into the outlet 2 and build up reduced pressure on this outlet side. This reduced pressure is transmitted through pipe 7 to the diaphragm chamber 23 of the pilot valve. Pressure in this chamber forces rod 27 downward compressing spring 44, and allowing spring 34 to close the valve 33, thereby trapping the auxiliary fluid between this point and diaphragm 16. Valve 9 will remain in its position if and as long as the pressure on outlet side 2 of the regulator is that for which the mechanism has been adjusted. Should the pressure build up to a point higher than that desired, further downward motion of the rod 27 will result, compressing spring 44 further and allowing disk valve 31 to be forced off its seat by the pressure on its lower side, pressure on the lower side of diaphragm 37 having pushed nozzle 32 into its uppermost position with nut 39 engaging the lower end of guide nut 40. With the upper end of the nozzle open auxiliary fluid from the chamber above diaphragm 16 of the regulator and from line 4 escapes to outlet 42, permitting spring 19 of the regulator to force diaphragm 16 up and spring 59 to move valve 9 toward closed position. When the pressure in outlet 2 has been diminished to the desired point the diminished pressure in diaphragm chamber 23 will permit spring 25 of the pilot valve to raise the diaphragm, and spring 44 will then again cause disk valve 31 to seat on the port at the upper end of the nozzle 32. It will be noted that with the stated adjustment of the pilot valve, there is no continued flow of auxiliary fluid through the pilot, and that the amount of auxiliary fluid going to discharge is reduced to a minimum.

The following feature of this operation will be stated in detail as it forms the most important phase of the invention:

When the pressure in outlet 2 of the regulator builds up and valve 33 of the pilot valve seats, this seating involves the following factors: pressure on diaphragm 24 compresses spring 25 and downward movement of rod 27 compresses spring 44, thereby permitting upward movement of the alined parts from rod 30 to valve 33. The force of spring 34 and the fluid pressure on diaphragm 37 and on the area of valve 31 lying within the port 35 all exert a compression force on spring 44. When rod 27 has taken up enough of the compressive force of spring 44 to permit these combined upward forces to overcome the remaining force of spring 44, the parts from rod 30 to valve 33 move upward together and valve 33 seats. After this, spring 34 has no further effect as far as upward movement of the remaining parts is concerned. The forces that remain to effect the upward movement are the pressures on the diaphragm 37 and on valve 31. A very slight further increase of pressure on diaphragm 24 to make up for the force of spring 34 permits the parts to move upward by the slight amount required to take up the slight play left between nut 39 and its stop, the lower end of guide nut 40. Thereafter no further upward movement of nozzle 32 is possible, and the pressure on the diaphragm 37 is ineffective to raise valve 31, the only force to effect this being the pressure on the area of the valve lying within the port 35. With this diminution in forces tending to compress spring 44 there will be required a positive and definite increase of pressure on diaphragm 24 to aid in compressing spring 44 before the pressure on valve 31 can force the valve up to open position. Instead therefore of popping open immediately after valve 33 seats, valve 31 opens only after a further slight but positive increase in pressure in outlet 2. This prevents oversensitive action and over-regulation and hunting, and so makes the action stable. A similar stabilizing effect is accomplished when the valves move in the opposite direction with a dropping pressure in outlet 2. This will be obvious and need not be stated in detail.

Obviously the additional change required in the pressure at 2 between the seating of valve 33 and the opening of valve 31 depends on the proportion of the upward force removed when diaphragm 37 is rendered ineffective. The smaller the diaphragm the smaller will be the interval. The exact interval required for a given installation will depend on several considerations, particularly the allowable variation in the reduced pressure of the fluid to be regulated. To make a single class of pilot adaptable to a considerable range of conditions, the provision shown on an enlarged scale in Fig. 2A is useful. Above the diaphragm 37 is placed a washer 37W whose central opening determines the effective part of the diaphragm, the annular portion of the diaphragm outside of this central opening always being in contact with the washer and therefore ineffective. By using washers of various central openings, the interval or lag referred to above can be varied over quite a range.

It will be clear at once that instead of using a washer with the required size of central opening, the cap 37c can be given the required central bore once the desired interval is determined. The same size of cap can thus be used for different requirements by boring it out to the size required for any given condition.

While the adjustments assumed above are the normal and intended ones, the apparatus is very flexible and permits of a considerable range of setting and operation. Thus by suitably adjusting screw 40, the interval between the seating of valve 33 and the engagement of nut 39 with screw 40 can be made anything desired, which will work toward adjusting the interval between the closing of 33 and the opening of valve 31. The setting can be either that assumed in the above detailed description where after valve 33 seats, tube 32 must travel some distance farther before nut 39 and screw 40 engage, and before therefore valve 31 can open; or the setting may be such that the seating of valve 33 and the engagement of nut 39 and screw 40 occur simultaneously so that on the slightest further upward movement of valve 31 this valve becomes unseated; or in the third place the setting may be such that nut 39 engages screw 40 before valve 33 seats, in which case valve 33 is held open permanently.

This last setting is used where for any reason it is desired to use the device as a constant bleed pilot. Valve 33 being held open, there is a constant flow past it through tube 32 to chamber 41, as long as valve 31 is open. It will be noted that the maximum rate at which bleeding to atmosphere takes place can be fixed by suitably setting screw 31m, against which valve 31 abuts in its widest open position.

If pressure changes on the outlet side of the regulator are only slight, calling for only slight adjustments of the regulator, these necessary slight adjustments will result from a change of position of valve 31 only, the position of valve 33 remaining unaltered. It is only when a more pronounced change of position of the regulator valve is required, that valve 33 is also called into action, the required adjustment of the regulator valve being thereby accelerated. This represents a distinct improvement over the action of prior devices of the constant leak type.

The fit of tube 32 in the guide screw 40 is a loose one, and not such as to entail any appreciable frictional resistance to movement such as a stuffing box would produce.

I am aware of prior pilot valves which have parts resembling somewhat in their arrangement the elements of my pilot valve. In such devices, however, the opening of the valve to atmosphere necessarily follows immediately upon the closing of the inlet pilot valve, without any positive, adjustable interval during which the forces applied are changed, as is the case in the present device. The action of such prior valves has for such reasons been found lacking in stability.

Figure 4:
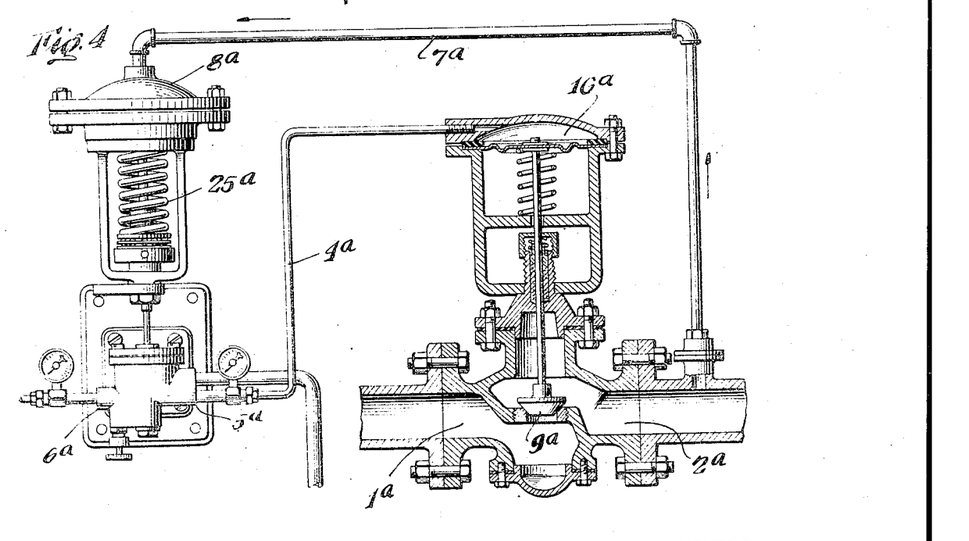
Fig. 4 is an elevation similar to Fig. 1 of a variation.
Figure 5:
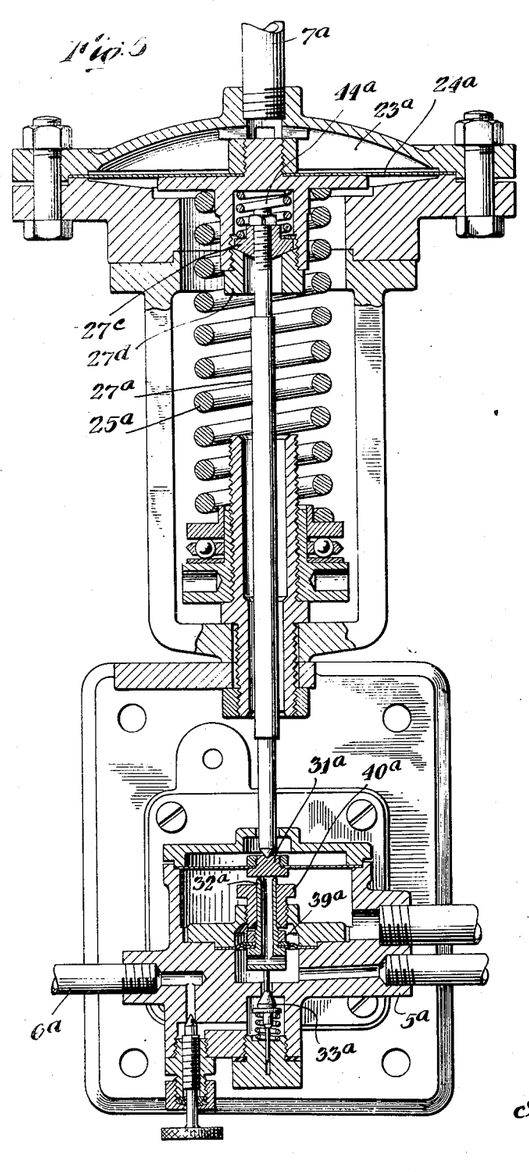
Fig. 5 is an axial section of this form of the pilot valve.

It will be noted that the form of the pilot valve described above is of a type which is usually referred to as a reverse acting type, i. e., an increase in the controlled pressure results in a decrease in the auxiliary pressure operating the regulating valve and vice versa. The regulating valve used in connection with this form of pilot valve is also of the reverse-acting type, i. e., it is normally closed and increase of pressure on its diaphragm moves it in an opening direction. The principle of my improved pilot valve can however also be applied to a direct-acting type of valve and this is illustrated in Figs. 4 and 5. The valve 9a of the regulator here moves in a closing direction with an increase of auxiliary fluid pressure in diaphragm chamber 16a. The form of the pilot valve is shown in detail in Fig. 5. The spring 25a acts in opposition to pressure in the diaphragm chamber 23a. Spring 44a is interposed between diaphragm 24a and stem 27a, engaging adjustable nut 27c at the upper end of the stem. Nut 27c is normally held in engagement with nut 27d by spring 44a; and these parts, together with stem 27a, normally move in unison with diaphragm 24a. The function of spring 44a is to prevent excessive stresses and breakage.

The impulse for diaphragm 24a is taken from the outlet 2a of the regulator, being transmitted through line 7a. The auxiliary fluid enters the pilot valve at 6a and leaves through 4a for the diaphragm chamber of the regulator.

The action may be briefly stated as follows: If the pressure in 2a rises beyond the desired point the increased pressure transmitted through 7a causes diaphragm 24a to compress spring 25a and to move stem 27a downward. This causes valve 33a to open and admit operating fluid to the diaphragm chamber of the regulating valve, moving it in a closing direction thereby causing the pressure in 2a to become reduced.

When the pressure in 2a has reached the desired point, this diminished pressure will allow spring 25a to raise stem 27a thereby allowing the pilot valve 33a to close. The auxiliary fluid trapped between the valve 33a and the diaphragm of the regulator keeps the regulator valve in a definite position. If the pressure at 2a continues to drop, a further slight reduction permits the valve 31a to unseat, thereby permitting some of the trapped auxiliary fluid to escape and allowing valve 9a to move in an opening direction. When valve 9a has reached the right position to give the desired reduced pressure at 2a, valve 31a will again close.

It will be noted that in this form also valve 31a will not open until the opposition to its upward movement has been diminished by a certain amount beyond what it was when nut 39a engaged the lower end of the guide nut 40a, the reason being the same as that stated above in connection with the first form of the valve. For the same reason this form insures stability of operation of the regulating valve.

In the form of this variation illustrated in the drawings, the guide nut 40a also permits adjustment such that the seating of valve 33a and contacting of nut 39a with guide nut 40a occur simultaneously or with the valve closing prior to such contacting, or being held open at all times. The adjustment of the rate of leakage by a nut corresponding to 31m of Fig. 1 has been omitted, although it can be added if desired.

In the foregoing description, as stated in the introductory remarks, the invention has been described as applied to a pressure reducing valve. Obviously the auxiliary fluid may actuate something different from a pressure reducing valve. It might, for example, act on a device controlling the flow of steam to a pump forcing water into a tank in which case the changes in the level of the water in the tank would be utilized to throw the pilot valve into and out of action. Other uses for the present improved pilot valve will readily suggest themselves. In all cases more stable action of the regulator will be obtained, and the other specific advantages of the pilot valve will likewise be present.

What I claim is:

1. In a pilot valve, a casing, a diaphragm closing the upper end, a second diaphragm parallel to the first and dividing the interior into two portions, a duct leading from the portion between the diaphragms, an inlet to and a duct from the portion below the second diaphragm, a perforated element extending through and carried by the second diaphragm and establishing communication between the two portions, an adjustable stop limiting the upward movement of the second diaphragm, a valve controlling said inlet and resiliently urged against a fixed seat, means whereby downward movement of said second diaphragm opens said valve, a valve mounted on said first diaphragm and controlling the perforation through said element, the relation of the parts being such that when the upper diaphragm is forced downward the valve mounted on it engages its seat on the perforation, further movement moves the lower diaphragm away from its stop, and through a predetermined distance, whereafter further movement opens the inlet valve.

2. Apparatus according to claim 1, and comprising a further adjustable stop limiting the upward movement of the upper diaphragm and the distance the valve carried by it can open.

3. Apparatus according to claim 1, the adjustable stop for the upward movement of the lower diaphragm being such that the interval between the closing of the valve carried by the upper diaphragm and the opening of the inlet valve can be reduced to zero.

4. Apparatus according to claim 1, the adjustable stop for the upward movement of the lower diaphragm being such that the inlet valve can be held open permanently.

5. In a regulating mechanism, a fluid pressure operated regulator, actuating means responsive to an impulse indicative of the condition of the medium controlled by said regulator and fluid pressure operated mechanism controlled by said actuating means comprising structure providing a chamber, an inlet for admitting operating fluid to said chamber, a positively seating inlet valve for controlling the admission of operating fluid to said chamber, a conduit providing a permanent communication between said chamber and said regulator, a yieldable member forming a part of the wall of said chamber and exposed to the operating pressure of said fluid only on the chamber side, a passage extending through said member for discharge of operating fluid from said chamber, a positively seating outlet valve for controlling flow through said passage, one of the co-acting seating elements of said outlet valve being carried by and movable with said yieldable member, said actuating means being operatively connected with said inlet valve and said outlet valve to open and close the valves, said outlet valve being movable independently of said inlet valve due to pressure within said chamber after said inlet valve is seated and means providing a stop for positively limiting the movement of said yieldable member under the influence of the pressure of the operating fluid in said chamber.

6. In a regulating mechanism, a fluid pressure operated regulator, actuating means responsive to an impulse indicative of the condition of the medium controlled by said regulator and fluid pressure operated mechanism controlled by said actuating means comprising structure providing a chamber, an inlet for admitting operating fluid to said chamber, a positively seating inlet valve for controlling the admission of operating fluid to said chamber, a conduit providing a permanent communication between said chamber and said regulator, a yieldable member forming a part of the wall of said chamber and exposed to the operating pressure of said fluid only on the chamber side, a passage extending through said member for discharge of operating fluid from said chamber, a positively seating outlet valve for controlling flow through said passage, one of the co-acting seating elements of said outlet valve being carried by and movable with said yieldable member, said actuating means being operatively connected with said inlet valve and said outlet valve to open and close the valves, said outlet valve being movable independently of said inlet valve due to pressure within said chamber after said inlet valve is seated, and an adjustable stop carried by said structure for positively limiting movement of said yieldable member, said stop forming an abutment for preventing transmission of force due to pressure of the operating fluid on said yieldable member to said actuating means after said yieldable member is moved into contact with the stop.

7. In a regulating mechanism, a fluid pressure operated regulator, actuating means responsive to an impulse indicative of the condition of the medium controlled by said regulator, and fluid pressure operated mechanism controlled by said actuating means comprising a housing providing a chamber, a first diaphragm separating the chamber into two portions, a perforated element extending through and carried by said diaphragm putting the two chamber portions in communication, an inlet for admitting pressure fluid to the first chamber portion, a positively seating inlet valve for controlling flow through said inlet, a permanently open conduit providing communication between the first chamber portion and said regulator, a duct to waste leading from the second chamber portion, a positively seating outlet valve for controlling flow to waste, a second diaphragm serving to close one end of said second chamber portion, said second diaphragm carrying a valve member of said outlet valve and said valve member coacting with the perforation of the element carried by said first diaphragm to control flow to waste, and means for operating said valves in response to movement of said actuating means.

8. In a regulating mechanism, a fluid pressure operated regulator, actuating means responsive to an impulse indicative of the condition of the medium controlled by said regulator, and fluid pressure operated mechanism controlled by said actuating means comprising a housing providing a chamber, a first diaphragm separating the chamber into two portions, a perforated element extending through and carried by said diaphragm putting the two chamber portions in communication, an inlet for admitting pressure fluid to the first chamber portion, a positively seating inlet valve for controlling flow through said inlet, a permanently open conduit providing communication between the first chamber portion and said regulator, a duct to waste leading from the second chamber portion, a positively seating outlet valve for controlling flow to waste, a second diaphragm serving to close one end of said second chamber portion, said second diaphragm carrying a valve member of said outlet valve and said valve member co-acting with the perforation of the element carried by said first diaphragm to control flow to waste, the seat for said inlet valve being fixed relatively to the housing, the inlet valve, the outlet valve and said perforated element being in alignment, the perforated element serving to open the inlet valve, resilient means urging the inlet valve to closed position, and said actuating means being operatively connected with the element of said outlet valve carried by said second diaphragm to control the positions of said valves.

9. In a pilot valve of the type in which operating fluid is admitted to and discharged from a pressure chamber, a flexible diaphragm forming a part of the wall of and subjected to the pressure within said chamber, an outlet valve for said chamber comprising a seat carried by said diaphragm and movable therewith and an outlet valve head mounted independently of said diaphragm and movable in response to a regulating impulse derived from a source external of said chamber, the pressure of operating fluid in said chamber acting on said diaphragm in a direction tending to move the valve seat toward the valve head to keep the valve closed and the pressure of operating fluid in said chamber also acting on said valve head in a direction tending to open the valve in opposition to force derived from said regulating impulse and tending to keep the valve closed, and means for positively limiting the movement of the diaphragm under the influence of the pressure acting thereon whereby to render such pressure ineffective after the valve seat reaches a predetermined position.

10. In a pilot valve of the type in which operating fluid is admitted to and discharged from a pressure chamber, a flexible diaphragm forming a part of the wall of and subjected to the pressure within said chamber, an outlet valve for said chamber comprising a seat carried by said diaphragm and movable therewith and an outlet valve head mounted independently of said diaphragm and movable in response to a regulating impulse derived from a source external of said chamber, the pressure of operating fluid in said chamber acting on said diaphragm in a direction tending to move the valve seat toward the valve head to keep the valve closed and the pressure of operating fluid in said chamber also acting on said valve head in a direction tending to open the valve in opposition to force derived from said regulating impulse and tending to keep the valve closed, and means providing an adjustable stop for positively limiting in predetermined selected position the movement of said diaphragm under the influence of the pressure acting thereon, whereby to render such pressure ineffective after said valve seat reaches a predetermined selected position.

11. In a pilot valve of the type in which operating fluid is admitted to and discharged from a pressure chamber, a diaphragm forming a portion of the wall of and subjected to fluid pressure within said chamber, an inlet valve located at the side of said chamber opposite said diaphragm, said inlet valve including a head arranged to move toward said diaphragm to closed position against a fixed seat, resilient means for urging said valve head to closed position, an outlet valve, said outlet valve comprising a hollow valve seat member carried by said diaphragm in line with said inlet valve and an outlet valve head member mounted independently of said diaphragm and movable in response to a regulating impulse derived from a source external of said chamber, said inlet valve head and said outlet valve head member being separate from each other, movement of the outlet valve members toward the inlet valve under the influence of said impulse operating to establish a force transmitting connection through the outlet valve members after the latter valve is closed to open the inlet valve, said outlet valve head member being subject to pressure of operating fluid in said chamber tending to open the outlet valve in opposition to force derived from said impulse and tending to close the valve and said diaphragm being subject to pressure of operating fluid in the chamber tending to keep said outlet valve closed, and means for rendering the pressure on the diaphragm ineffective to keep the outlet valve closed, said means comprising an adjustable stop for limiting the extent of movement of the diaphragm and the outlet valve seat in a direction toward the outlet valve head under the influence of the pressure of the operating fluid.

12. In a pilot valve of the type in which operating fluid is admitted to and discharged from a pressure chamber, a diaphragm forming a portion of the wall of and subjected to fluid pressure within said chamber, an inlet valve located at the side of said chamber opposite said diaphragm, said inlet valve including a head arranged to move toward said diaphragm to closed position against a fixed seat, resilient means for urging said valve head to closed position, an outlet valve, said outlet valve comprising a hollow valve seat member carried by said diaphragm, an outlet valve head member mounted independently of said diaphragm to close the outlet valve and thereafter move said diaphragm toward said inlet valve by continued movement in closing direction after the outlet valve is closed, means for causing movement of said diaphragm toward said inlet valve beyond a predetermined position to open said inlet valve due to force transmitted through the outlet valve members, means responsive to a regulating impulse derived from a source external of said chamber for moving said outlet valve head member toward said chamber, and means providing an adjustable stop for limiting movement of said diaphragm outwardly of said chamber under the influence of the pressure of operating fluid within the chamber.

13. In a pilot valve of the type in which operating fluid is admitted to and discharged from a pressure chamber, a diaphragm forming a portion of the wall of and subjected to fluid pressure within said chamber, an inlet valve located at the side of said chamber opposite said diaphragm, said inlet valve including a head arranged to move toward said diaphragm to closed position against a fixed seat, resilient means for urging said valve head to closed position, an outlet valve, said outlet valve comprising a hollow valve seat member carried by said diaphragm, an outlet valve head member mounted independently of said diaphragm to close the outlet valve and thereafter move said diaphragm toward said inlet valve by continued movement in closing direction after the outlet valve is closed, means for causing movement of said diaphragm toward said inlet valve beyond a predetermined position to open said inlet valve due to force transmitted through the outlet valve members, means responsive to a regulating impulse derived from a source external of said chamber for moving said outlet valve head member toward said chamber, and means providing an adjustable stop for limiting movement of said diaphragm outwardly of said chamber under the influence of the pressure of operating fluid within the chamber, said adjustable stop being constructed for adjustment to a position in which the diaphragm is forced inwardly of the chamber independently of said regulating impulse to a position in which said force transmitting means is effective to maintain said inlet valve constantly open.

14. In a pilot valve of the type in which operating fluid is admitted to and discharged from a pressure chamber, a diaphragm forming a portion of the wall of and subjected to fluid pressure within said chamber, an inlet valve located at the side of said chamber opposite said diaphragm, said inlet valve including a head arranged to move toward said diaphragm to closed position against a fixed seat, resilient means for urging said valve head to closed position, an outlet valve, said outlet valve comprising a hollow member carried by said diaphragm, said hollow member providing an outlet passage from said chamber and a valve seat at the outer end of the member, an outlet valve head movably mounted to move toward said chamber into engagement with said seat to close the outlet valve against the pressure of the operating fluid in said chamber, means for applying force to said outlet valve head, the value of which force is determined by a regulating impulse, means including said hollow member providing a force transmitting connection for causing movement of the outlet valve head toward said chamber beyond a predetermined position to move the inlet valve head from its seat, said hollow member tending to move away from said chamber toward the outlet valve head under the influence of the pressure of operating fluid in said chamber and means providing a positive stop for limiting the extent of movement of said hollow member toward said outlet valve head.

15. In a pilot valve of the type in which operating fluid is admitted to and discharged from a pressure chamber, a first diaphragm forming a portion of the wall of and subjected to fluid pressure within said chamber, an inlet valve located at the side of said chamber opposite said diaphragm, said inlet valve including a head arranged to move toward said diaphragm to closed position against a fixed seat, resilient means for urging said valve head to closed position, an outlet valve, said outlet valve comprising a hollow member carried by said diaphragm, said hollow member providing an outlet passage from said chamber and a valve seat at the outer end of the member, means including a second diaphragm forming an outlet chamber with which said outlet passage communicates, an outlet valve head carried by said second diaphragm and movable toward and away from the outlet valve seat under the influence of variations in the value of a force derived from a regulating impulse and applied to the outlet valve head, means including the outlet valve head and said hollow member providing a force transmitting connection for opening said inlet valve when said diaphragms are moved toward the pressure chamber beyond a predetermined position due to said force, said hollow member tending to move toward the outlet valve head to keep the outlet valve closed due to pressure of the operating fluid on said first diaphragm, means providing a stop for positively limiting the movement of said hollow member toward the outlet valve head, said outlet valve head being subject to the pressure of the operating fluid in the first mentioned chamber tending to move it away from the outlet valve seat, and means providing a stop for limiting the movement of said outlet valve head away from said seat under the influence of the last mentioned pressure.

16. In a pilot valve of the type in which operating fluid is admitted to and discharged from a pressure chamber, a first diaphragm forming a portion of the wall of and subjected to fluid pressure within said chamber, an inlet valve located at the side of said chamber opposite said diaphragm, said inlet valve including a head arranged to move toward said diaphragm to closed position against a fixed seat, resilient means for urging said valve head to closed position, an outlet valve, said outlet valve comprising a hollow member carried by said diaphragm, said hollow member providing an outlet passage from said chamber and a valve seat at the outer end of the member, means including a second diaphragm forming an outlet chamber with which said outlet passage communicates, an outlet valve head carried by said second diaphragm and movable toward and away from the outlet valve seat under the influence of variations in the value of a force derived from a regulating impulse and applied to the outlet valve head, means including the outlet valve head and said hollow member providing a force transmitting connection for opening said inlet valve when said diaphragms are moved toward the pressure chamber beyond a predetermined position due to said force, said hollow member tending to move toward the outlet valve head to keep the outlet valve closed due to pressure of the operating fluid on said first diaphragm, means providing a stop for positively limiting the movement of said hollow member toward the outlet valve head, said outlet valve head being subject to the pressure of the operating fluid in the first mentioned chamber tending to move it away from the outlet valve seat, and means providing a stop for limiting the movement of said outlet valve head away from said seat under the influence of the last mentioned pressure, each of said stops being adjustable to limit to predetermined selected positions the movement away from said chamber of the respective diaphragms.

17. In a pilot valve, a chamber having an inlet, an outlet, and a duct leading to an actuating element of a regulating mechanism, a valve coacting with a fixed seat and controlling the inlet, a second valve separate from the first and coacting with a flexibly mounted seat and controlling the outlet, means actuating said valves in response to variations of a regulating impulse derived from a source external of said chamber and indicative of the condition of the medium controlled by the regulating mechanism, movement in one direction of the actuating means closing the outlet valve, further movement opening the inlet valve, and movement in the opposite direction closing the inlet valve and further movement opening the outlet valve, said flexibly mounted seat being subject to the pressure within said chamber in a direction tending to keep the outlet valve closed, whereby to require movement of the actuating means some distance after the inlet valve has been closed before the outlet valve is opened, and vice versa.

18. In a pilot valve, a chamber having an inlet, an outlet, and a duct leading to an actuating element of a regulating mechanism, a valve coacting with a fixed seat and controlling the inlet, a second valve separate from the first and coacting with a flexibly mounted seat and controlling the outlet, means actuating said valves in response to variations of a regulating impulse derived from a source external of said chamber and indicative of the condition of the medium controlled by the regulating mechanism, movement in one direction of the actuating means closing the outlet valve, further movement opening the inlet valve, and movement in the opposite direction closing the inlet valve and further movement opening the outlet valve, said flexibly mounted seat being subject to the pressure within said chamber in a direction tending to keep the outlet valve closed, whereby to require movement of the actuating means some distance after the inlet valve has been closed beforge the outlet valve is opened, and vice versa and an adjustable stop for limiting the movement of said flexibly mounted seat under the influence of said pressure, whereby to govern the extent of movement of said actuating means after one of said valves is closed and before the other of said valves is opened.

STEN E. B. SODERBERG.